(12) United States Patent
Fu et al.

(10) Patent No.: US 9,282,018 B2
(45) Date of Patent: *Mar. 8, 2016

(54) CLIENT-INDEPENDENT NETWORK SUPERVISION APPLICATION

(71) Applicant: Aerohive Networks, Inc., Sunnyvale, CA (US)

(72) Inventors: Long Fu, Saratoga, CA (US); Mingliang Li, Sunnyvale, CA (US); Yong Kang, Palo Alto, CA (US); Adam Conway, San Jose, CA (US); Dean Williams, Washougal, WA (US)

(73) Assignee: Aerohive Networks, Inc., Sunnyvale, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/177,159

(22) Filed: Feb. 10, 2014

(65) Prior Publication Data

US 2014/0156841 A1 Jun. 5, 2014

Related U.S. Application Data

(63) Continuation of application No. 13/192,325, filed on Jul. 27, 2011, now Pat. No. 8,671,187.

(60) Provisional application No. 61/368,244, filed on Jul. 27, 2010.

(51) Int. Cl.
*G06F 15/173* (2006.01)
*H04L 12/26* (2006.01)
(Continued)

(52) U.S. Cl.
CPC .............. *H04L 43/0876* (2013.01); *G09B 5/00* (2013.01); *G09B 7/02* (2013.01)

(58) Field of Classification Search
CPC .................................................. H04L 43/0876
USPC .................................................. 709/224, 223
See application file for complete search history.

(56) References Cited

U.S. PATENT DOCUMENTS 5,471,671 A   11/1995   Wang et al.
5,697,059 A   12/1997   Carney
(Continued)

OTHER PUBLICATIONS

Clausen, T., et al., "Optimized Link State Routing Protocol (OLSR)," Network Working Group, pp. 1-71, Oct. 2003.
(Continued)

*Primary Examiner* — Liangche A Wang
(74) *Attorney, Agent, or Firm* — Sheppard, Mullin, Richter & Hampton LLP (57) ABSTRACT

A network monitoring and control application suitable for use by teachers and other users is implemented using wireless access points and does not require specific software to be installed on client network devices. The application uses student and class information to organize network client information. Upon receiving a monitoring request, one or more classes assigned to the teacher are identified by accessing class data. Class data is accessed to identify students assigned to the class and the client network devices used by these students. One wireless access point providing wireless network connections to at least a portion of the students' devices is selected to collect network activity information from the students' devices and presents this information to the teacher. The teacher may also use the selected wireless access point to disable students' network access or to redirect students' devices to a network resource.

19 Claims, 4 Drawing Sheets

(51) Int. Cl.
*G09B 5/00* (2006.01)
*G09B 7/02* (2006.01)

(56) References Cited

U.S. PATENT DOCUMENTS

| | | |
|---|---|---|
| 5,726,984 A | 3/1998 | Kubler et al. |
| 5,956,643 A | 9/1999 | Benveniste |
| 6,112,092 A | 8/2000 | Benveniste |
| 6,154,655 A | 11/2000 | Borst et al. |
| 6,314,294 B1 | 11/2001 | Benveniste |
| 6,473,413 B1 | 10/2002 | Chiou et al. |
| 6,496,699 B2 | 12/2002 | Benveniste |
| 6,519,461 B1 | 2/2003 | Andersson et al. |
| 6,628,938 B1 | 9/2003 | Rachabathuni et al. |
| 6,775,549 B2 | 8/2004 | Benveniste |
| 6,865,393 B1 | 3/2005 | Baum et al. |
| 7,057,566 B2 | 6/2006 | Theobold |
| 7,085,224 B1 | 8/2006 | Oran |
| 7,085,241 B1 | 8/2006 | O'Neill et al. |
| 7,164,667 B2 | 1/2007 | Rayment et al. |
| 7,174,170 B2 | 2/2007 | Steer et al. |
| 7,177,646 B2 | 2/2007 | Corson et al. |
| 7,181,530 B1 | 2/2007 | Halasz et al. |
| 7,224,697 B2 | 5/2007 | Banerjea et al. |
| 7,251,238 B2 | 7/2007 | Joshi et al. |
| 7,409,588 B2 | 8/2008 | Yako et al. |
| 7,512,379 B2 | 3/2009 | Nguyen |
| 7,706,789 B2 | 4/2010 | Qi et al. |
| 7,716,370 B1 | 5/2010 | Devarapalli |
| 7,793,104 B2 | 9/2010 | Zheng et al. |
| 7,843,907 B1 | 11/2010 | Abou-Emara et al. |
| 7,844,057 B2 | 11/2010 | Meier et al. |
| 7,921,185 B2 | 4/2011 | Chawla et al. |
| 7,949,342 B2 | 5/2011 | Cuffaro et al. |
| 8,140,888 B1 | 3/2012 | Dhingra et al. |
| 8,174,966 B2 | 5/2012 | Taniguchi et al. |
| 8,219,688 B2 | 7/2012 | Wang |
| 8,249,606 B1 | 8/2012 | Neophytou et al. |
| 8,321,793 B1 * | 11/2012 | Cotter et al. .................. 715/745 |
| 8,869,235 B2 | 10/2014 | Qureshi et al. |
| 8,893,255 B1 | 11/2014 | Martini |
| 9,032,506 B2 | 5/2015 | Parla et al. |
| 9,152,782 B2 | 10/2015 | Lin et al. |
| 2002/0021689 A1 | 2/2002 | Robbins et al. |
| 2002/0071422 A1 | 6/2002 | Amicangioli |
| 2002/0091813 A1 | 7/2002 | Lamberton et al. |
| 2002/0116463 A1 | 8/2002 | Hart |
| 2002/0129146 A1 | 9/2002 | Aronoff et al. |
| 2003/0104814 A1 | 6/2003 | Gwon et al. |
| 2003/0126240 A1 | 7/2003 | Vosseler |
| 2003/0129988 A1 | 7/2003 | Lee et al. |
| 2003/0145091 A1 | 7/2003 | Peng et al. |
| 2003/0179742 A1 | 9/2003 | Ogier et al. |
| 2004/0013118 A1 | 1/2004 | Borella |
| 2004/0022222 A1 | 2/2004 | Clisham |
| 2004/0103282 A1 | 5/2004 | Meier et al. |
| 2004/0109466 A1 | 6/2004 | Van Ackere et al. |
| 2004/0162037 A1 | 8/2004 | Shpak |
| 2004/0192312 A1 | 9/2004 | Li et al. |
| 2004/0236939 A1 | 11/2004 | Watanabe et al. |
| 2004/0255028 A1 | 12/2004 | Chu et al. |
| 2005/0053003 A1 | 3/2005 | Cain et al. |
| 2005/0074015 A1 | 4/2005 | Chari et al. |
| 2005/0086255 A1 * | 4/2005 | Schran et al. .................. 707/102 |
| 2005/0099983 A1 | 5/2005 | Nakamura et al. |
| 2005/0122946 A1 | 6/2005 | Won |
| 2005/0207417 A1 | 9/2005 | Ogawa et al. |
| 2005/0262266 A1 | 11/2005 | Wiberg et al. |
| 2005/0266848 A1 | 12/2005 | Kim |
| 2006/0026289 A1 | 2/2006 | Lyndersay et al. |
| 2006/0062250 A1 | 3/2006 | Payne, III |
| 2006/0107050 A1 | 5/2006 | Shih |
| 2006/0117018 A1 | 6/2006 | Christiansen et al. |
| 2006/0140123 A1 | 6/2006 | Conner et al. |
| 2006/0146748 A1 | 7/2006 | Ng et al. |
| 2006/0146846 A1 | 7/2006 | Yarvis et al. |
| 2006/0187949 A1 | 8/2006 | Seshan et al. |
| 2006/0221920 A1 | 10/2006 | Gopalakrishnan et al. |
| 2006/0233128 A1 | 10/2006 | Sood et al. |
| 2006/0234701 A1 | 10/2006 | Wang et al. |
| 2006/0245442 A1 | 11/2006 | Srikrishna et al. |
| 2006/0268802 A1 | 11/2006 | Faccin |
| 2006/0294246 A1 | 12/2006 | Stieglitz et al. |
| 2007/0010231 A1 | 1/2007 | Du |
| 2007/0025274 A1 | 2/2007 | Rahman et al. |
| 2007/0078663 A1 | 4/2007 | Grace |
| 2007/0082656 A1 | 4/2007 | Stieglitz et al. |
| 2007/0091859 A1 | 4/2007 | Sethi et al. |
| 2007/0116011 A1 | 5/2007 | Lim et al. |
| 2007/0121947 A1 | 5/2007 | Sood et al. |
| 2007/0133407 A1 | 6/2007 | Choi et al. |
| 2007/0140191 A1 | 6/2007 | Kojima |
| 2007/0150603 A1 * | 6/2007 | Crull et al. .................. 709/227 |
| 2007/0198713 A1 | 8/2007 | Tsao et al. |
| 2007/0249324 A1 | 10/2007 | Jou et al. |
| 2007/0263532 A1 | 11/2007 | Mirtorabi et al. |
| 2007/0280481 A1 | 12/2007 | Eastlake et al. |
| 2007/0288997 A1 | 12/2007 | Meier et al. |
| 2008/0002642 A1 | 1/2008 | Borkar et al. |
| 2008/0077791 A1 | 3/2008 | Lund et al. |
| 2008/0080369 A1 | 4/2008 | Sumioka |
| 2008/0080377 A1 | 4/2008 | Sasaki et al. |
| 2008/0090575 A1 | 4/2008 | Barak et al. |
| 2008/0095094 A1 | 4/2008 | Innami |
| 2008/0126845 A1 | 5/2008 | Luo et al. |
| 2008/0130495 A1 | 6/2008 | Dos Remedios et al. |
| 2008/0146240 A1 | 6/2008 | Trudeau |
| 2008/0170527 A1 | 7/2008 | Lundsgaard et al. |
| 2008/0207215 A1 | 8/2008 | Chu et al. |
| 2008/0225857 A1 | 9/2008 | Lange |
| 2008/0229095 A1 | 9/2008 | Kalimuthu et al. |
| 2008/0273520 A1 | 11/2008 | Kim et al. |
| 2009/0019182 A1 * | 1/2009 | Riise et al. .................. 709/245 |
| 2009/0028052 A1 | 1/2009 | Strater et al. |
| 2009/0059874 A1 * | 3/2009 | Carter .................. 370/338 |
| 2009/0082025 A1 | 3/2009 | Song |
| 2009/0088152 A1 | 4/2009 | Orlassino |
| 2009/0097436 A1 | 4/2009 | Vasudevan et al. |
| 2009/0111468 A1 | 4/2009 | Burgess et al. |
| 2009/0141692 A1 | 6/2009 | Kasslin et al. |
| 2009/0144740 A1 | 6/2009 | Gao |
| 2009/0168645 A1 | 7/2009 | Tester et al. |
| 2009/0239531 A1 | 9/2009 | Andreasen et al. |
| 2009/0240789 A1 | 9/2009 | Dandabany |
| 2009/0247170 A1 | 10/2009 | Balasubramanian et al. |
| 2010/0057930 A1 | 3/2010 | DeHaan |
| 2010/0095359 A1 * | 4/2010 | Gordon .................. 726/6 |
| 2010/0112540 A1 | 5/2010 | Gross et al. |
| 2010/0115576 A1 | 5/2010 | Hale et al. |
| 2010/0208614 A1 | 8/2010 | Harmatos |
| 2010/0228843 A1 | 9/2010 | Ok et al. |
| 2010/0254316 A1 | 10/2010 | Sendrowicz |
| 2010/0260091 A1 | 10/2010 | Seok |
| 2010/0304738 A1 | 12/2010 | Lim et al. |
| 2010/0311420 A1 | 12/2010 | Reza et al. |
| 2010/0322217 A1 | 12/2010 | Jin et al. |
| 2010/0325259 A1 * | 12/2010 | Schuler .................. 709/224 |
| 2011/0004913 A1 | 1/2011 | Nagarajan et al. |
| 2011/0040867 A1 * | 2/2011 | Kalbag .................. 709/224 |
| 2011/0055326 A1 | 3/2011 | Michaelis et al. |
| 2011/0064065 A1 | 3/2011 | Nakajima et al. |
| 2011/0182225 A1 | 7/2011 | Song et al. |
| 2011/0185231 A1 | 7/2011 | Balestrieri et al. |
| 2012/0014386 A1 | 1/2012 | Xiong et al. |
| 2012/0159531 A1 | 6/2012 | O'Callaghan |
| 2012/0290650 A1 | 11/2012 | Montuno et al. |
| 2013/0028158 A1 | 1/2013 | Lee et al. |
| 2013/0254831 A1 | 9/2013 | Roach et al. |
| 2013/0254889 A1 | 9/2013 | Stuntebeck |
| 2014/0101439 A1 | 4/2014 | Pettigrew et al. |
| 2014/0196129 A1 | 7/2014 | Amin |
| 2014/0258231 A1 | 9/2014 | Birk et al. |
| 2014/0281672 A1 | 9/2014 | Fu et al. |
| 2014/0282902 A1 | 9/2014 | Zou et al. |

(56) References Cited

U.S. PATENT DOCUMENTS

2014/0282916 A1  9/2014  Gast
2014/0304808 A1  10/2014  Martini
2014/0351370 A1  11/2014  Ashley et al.

OTHER PUBLICATIONS

He, Changhua et al., "Analysis of the 802.11i 4-Way Handshake," Proceedings of the 3rd ACM Workshop on Wireless Security, pp. 43-50, Oct. 2004.

Lee, Jae Woo et al, "z2z: Discovering Zeroconf Services Beyond Local Link," 2007 IEEE Globecom Workshops, pp. 1-7, Nov. 26, 2007.

Perkins, C., et al., "Ad hoc On-Demand Distance Vector (AODV) Routing," Network Working Group, pp. 1-35, Oct. 2003.

International Application No. PCT/US2008/061674, International Search Report and Written Opinion mailed Oct. 14, 2008.

International Application No. PCT/US2011/047591, International Search Report and Written Opinion mailed Dec. 19, 2011.

International Application No. PCT/US2012/059093, International Search Report and Written Opinion mailed Jan. 4, 2013.

Chen, Minder et al., "Providing Web Services to Mobile Users: The Architecture Design of an m-Service Portal," International Journal of Mobile Communications, vol. 3, No. 1, pp. 1-18, May 2005.

Kindberg, Tim et al., "People, Places, Things: Web Presence for the Real World," Mobile Networks and Applications, vol. 7, No. 5, pp. 365-376, Oct. 2002.

Cisco Systems, Inc., "Cisco TrustSec™ 2.0: Design and Implementation Guide," Document Version 2.0, Nov. 29, 2011.

Cisco Systems, Inc., "TrustSec How-To Guide: On-boarding and Provisioning," Document Version 3.0, Aug. 27, 2012.

* cited by examiner

CLIENT-INDEPENDENT NETWORK SUPERVISION APPLICATION

CROSS-REFERENCE TO RELATED APPLICATIONS

This application is a continuation application of U.S. patent application Ser. No. 13/192,325, filed Jul. 27, 2011, entitled "CLIENT-INDEPENDENT NETWORK SUPERVISION APPLICATION," which claims priority to U.S. Provisional Patent Application Ser. No. 61/368,244, filed Jul. 27, 2010, entitled "CLIENT-INDEPENDENT NETWORK SUPERVISION APPLICATION," all of which are incorporated by reference herein.

BACKGROUND OF THE INVENTION

The invention relates to the field of network monitoring and supervision application. Educational institutions often provide computers and network access to their students and teachers to facilitate instruction. For example, students and teachers may each be provided with a computer system or other electronic communications device, such as a tablet computer or personal digital assistant. Each student and/or teacher may use their assigned device for some or all of their classes and assignments. In another example, a specific classroom may include computer systems or other devices for use by all of the students assigned to that classroom for one or more classes. In yet another example, a set of computer systems or other devices may be assigned to a cart or cabinet that can be moved to different classrooms according to the needs of students and teachers.

One downside with incorporating computers and other devices in educational environments is that teachers or other instructors often need to monitor the network usage of their students. For example, when a class begins, the teacher may instruct the students to start their computers and access a specific web site. After providing these instructions, the teacher must then walk around the classroom to verify that all of the students' computers have successfully connected to the network and are viewing the specified web site. As the class continues, the teacher may need to frequently patrol the classroom to ensure that all of the students are using their computers in an appropriate manner. The time and effort required to monitor and supervise students' network usage reduces the time and quality of classroom instruction.

Prior systems for monitoring and supervising students' network usage rely on monitoring applications installed on each student's computer. Because these monitoring applications are installed and executed on students' computers, they must be compatible with the hardware, operating system, and software configuration of these computers or other devices. This increases the administrative overhead required to deploy and maintain student computers and limits the types of devices that can be provided to students. Additionally, installing monitoring applications on students' computers can create privacy issues. In some cases, teachers and school administrators may be liable for violating student privacy rights if the monitoring applications are activated outside of school, such as at a student's home.

Additionally, traditional network monitoring applications are tailored towards the needs of system administrators. The user interface and type of information of these prior network monitoring applications is intended for computer-literate and technically sophisticated users. The interface and type of information provided by these applications may be unsuitable for many teachers and school administrators. Furthermore, traditional network monitoring applications identify users and client network devices by hardware attributes, such as MAC addresses, or user attributes, such as user login identifications. However, these prior network monitoring applications do not organize network information in manner relevant to teachers and school administrators, such as by classes, class schedules, or classrooms.

BRIEF SUMMARY OF THE INVENTION

An embodiment of the invention includes a simplified network monitoring and control application suitable for use by teachers and other supervisors. An embodiment of the invention is implemented using wireless access points and other network devices and thus does not require specific software to be installed on client network devices. Thus, this embodiment of the invention can operate with any type of network client capable of communicating via a wireless network interface. An embodiment of the invention uses student and class information to organize network client information in a manner relevant to teachers and other users. An embodiment of the invention monitors and controls client network devices using a decentralized system, so that individual network devices are not overburdened.

Upon receiving a monitoring request from a teacher or other user, an embodiment of the invention identifies one or more classes assigned to the teacher by accessing class data. A teacher or other user may select one of the identified classes or alternatively, an embodiment automatically selects one of the classes based on a class schedule and/or class location. Once a class has been selected by the teacher, an embodiment of the invention accesses class data to identify students assigned to the class. This embodiment of the invention further identifies client network devices used by these students. An embodiment of the invention then selects one wireless access point providing wireless network connections to at least a portion of the students' client network devices. The selected wireless access point collects network activity information from the students' client network devices and presents this information to the teacher or other user.

In an embodiment, the teacher may also use the selected wireless access point to selectively enable or disable local and/or wide-area network access to one or more student client network devices. In a further embodiment, the teacher may also use the selected wireless access point to redirect students' client network devices to a desired network resource. In this embodiment, the teacher or other user provides the selected wireless access point with a network address of the network resource. The selected wireless access point then intercepts network resource requests from at least a portion of the students' client network devices. In response to these network resource requests, the selected wireless access point sends redirection messages including the provided network address to the students' client network devices. The students' client network devices then retrieve the desired network resource automatically.

BRIEF DESCRIPTION OF THE DRAWINGS

The invention will be described with reference to the drawings, in which.

DETAILED DESCRIPTION OF THE INVENTION

An embodiment of the invention includes a simplified network monitoring and control application suitable for use by teachers and other supervisors. An embodiment of the invention is implemented using wireless access points and other network devices and thus does not require specific software to be installed on client network devices. Thus, this embodiment of the invention can operate with any type of network client capable of communicating via a wireless network interface. An embodiment of the invention uses student and class information to organize network client information in a manner relevant to teachers and other users. An embodiment of the invention monitors and controls client network devices using a decentralized system, so that individual network devices are not overburdened.

Figure 1:
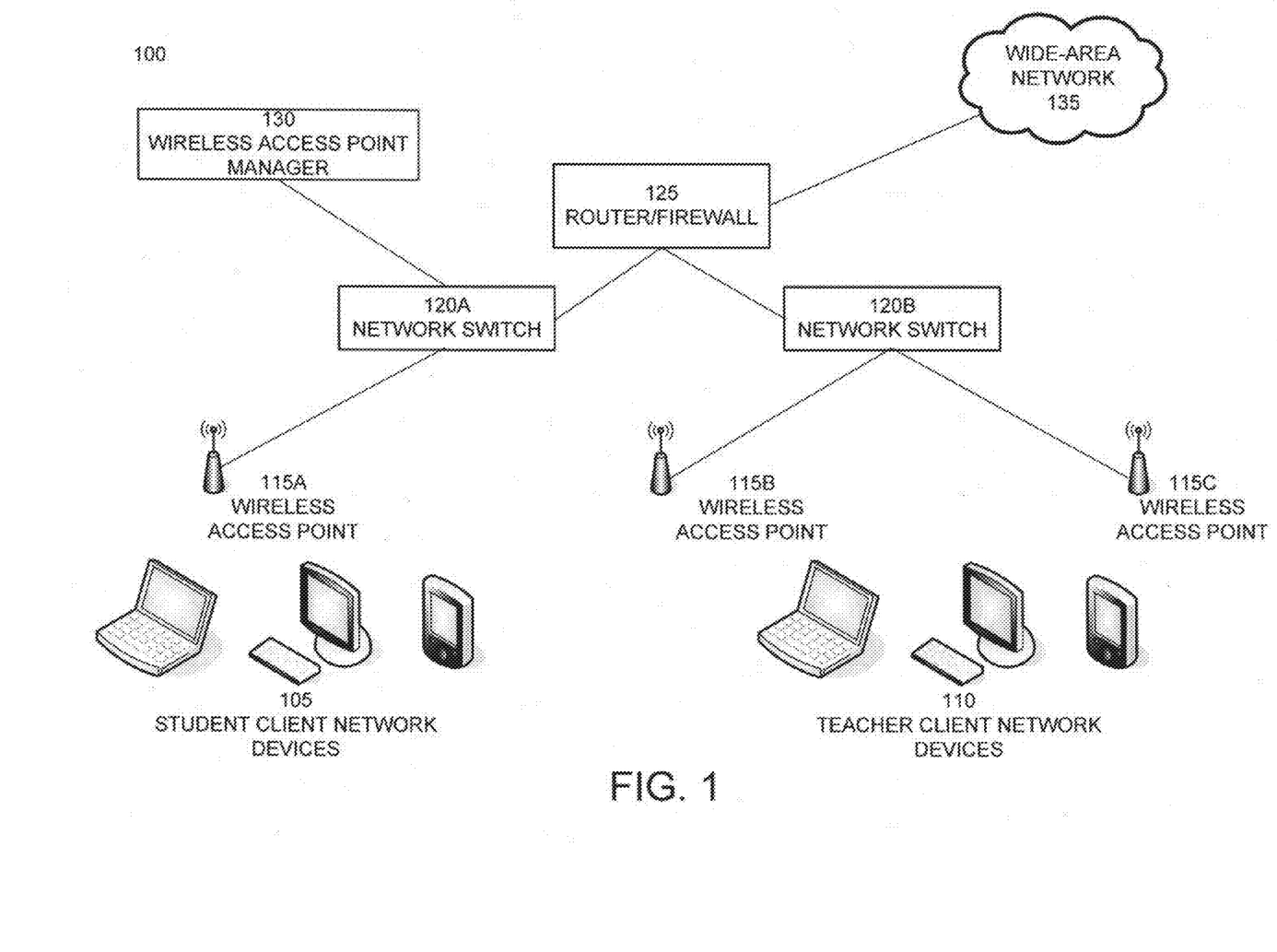
FIG. 1 illustrates an example system suitable for use with embodiments of the invention.

FIG. 1 illustrates an example system 100 suitable for use with embodiments of the invention. System 100 includes a plurality of student client network devices 105. Student client network devices 105 may include portable or desktop personal computers, tablet computers, mobile internet access or web browsing devices, personal digital assistant devices, and any other type of electronic communications device capable of retrieving data via an electronic communications network. Student client network devices 105 may be assigned to specific students, to specific classrooms, to carts or cabinets that can be moved to different classrooms according to the needs of students and teachers, or distributed on an ad-hoc basis to students as needed.

Similarly, system 100 includes a plurality of teacher client network devices 110. Teacher network devices 110 may include portable or desktop personal computers, tablet computers, mobile internet access or web browsing devices, personal digital assistant devices, and any other type of electronic communications device capable of retrieving data via an electronic communications network. Teacher client network devices 105 may be assigned to specific teachers, school administrators, and/or other staff members; to specific classrooms; to carts or cabinets that can be moved to different classrooms according to the needs of students and teachers; or distributed on an ad-hoc basis to teachers and other personnel as needed.

Student and teacher client network devices 105 and 110 are connected with one or more local area networks via wireless network connections provided by wireless access points 115, such as wireless access points 115a, 115b, and 115c. Wireless access points 115 may use any wireless networking technology and protocol known in the art, including one or more of the IEEE 802.11 family of wireless networking standards.

Wireless access points 115 are connected with one or more local-area networks via one or more network switches 120 or other network devices, such as network switches 120a and 120b. Network switches and other local-area network devices 120 are connected with a router and/or firewall network device 125. Router and firewall network device 125 may provide network address translation, network address assignment, and network security for the local-area networks. Additionally router and firewall network device 125 optionally connects the local-area networks with a wide-area network 135, such as the internet.

System 100 may also include a wireless access point manager 130 that controls the configuration of the wireless access points 115. Wireless access point manager 130 may facilitate the deployment of network policies, software and firmware upgrades, and configurations to wireless access points 115. Wireless access point manager 130 may also monitor network usage by client network devices 105 and 110 via the wireless access points 115. In an embodiment, the wireless access point manager 130 is adapted for use in a controller-less system, in which control and forwarding of network traffic is distributed among the wireless access points 115. In an alternate embodiment of system 100, the wireless access point manager 130 operates in conjunction with a wireless access point controller that intercepts, analyzes, and forwards substantially all of the network traffic associated with the wireless access points 115.

Figure 2:
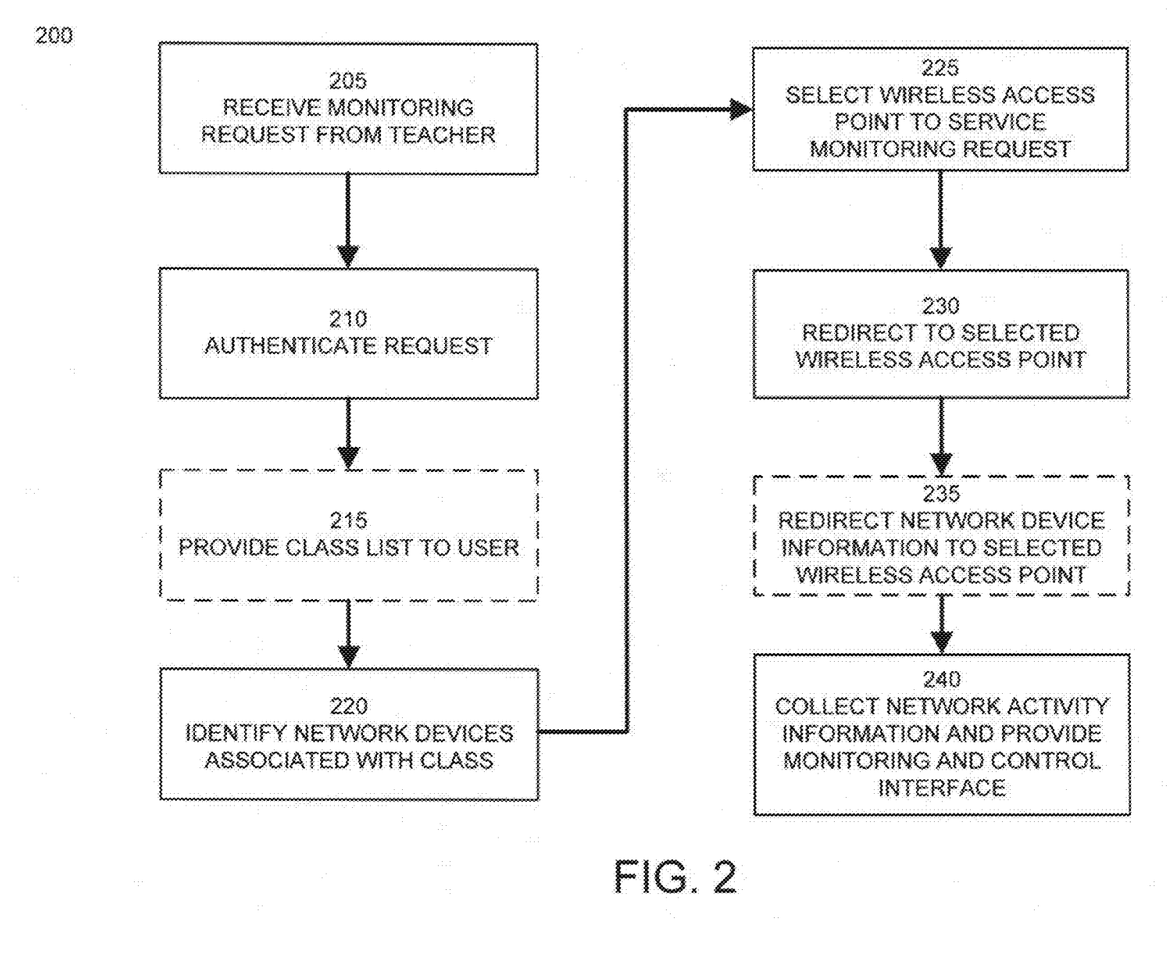
FIG. 2 illustrates a method of aggregating network client information according to an embodiment of the invention.

FIG. 2 illustrates a method 200 of aggregating network client information according to an embodiment of the invention. Step 205 receives an monitoring request from a user, such as a teacher or school administrator. In an embodiment, the monitoring request may be a web page monitoring request, such as a HTTP request, addressed to a previously determined network address or domain. In a further embodiment, the monitoring request is addressed or redirected to a wireless access point manager.

In response to receiving the monitoring request in step 205, step 210 authenticates the user request, for example by requesting that the user provide a login identification and password. In an embodiment of method 200, a user interface is provided to the user in the form of one or more web pages provided by the wireless access point manager, wireless access points, or other network devices. In an embodiment, step 210 may access an authentication system to authenticate users, such as RADIUS, Active Directory, Captive Web Portal, or a private PSK scheme, such as that described in U.S. patent application Ser. No. 12/485,041, filed Jun. 16, 2009, and entitled "EXCLUSIVE PRESHARED KEY AUTHENTICATION," which is incorporated by reference herein. The private PSK scheme assigns a unique pre-shared key (PSK) to each wireless network user. Thus, the user is authenticated automatically upon connecting with the wireless network with their assigned key.

Following successful authentication of the user by step 210, step 215 provides the user with a list of classes to monitor and/or control. An embodiment of step 215 accesses a database or other data storage structure to identify one or more classes associated with the user. For example, if the user is a teacher, then step 215 may identify one or more classes that have been assigned to the teacher. If the user is a substitute teacher or other school administrator, the user may provide a supplemental identification of a primary teacher. Step 215 uses this supplemental identification to identify one or more classes assigned to the primary teacher and potentially of interest to the user. In a further embodiment, step 215 may compare the current day and/or time with class schedules to automatically identify one or more classes associated with the user that are in progress, starting soon, or recently ended.

In another embodiment, step 215 may identify one or more classes associated with the user based on the location of the user's computer or other client network device. The location of the user's network client may be identified using wireless network location detection techniques, such as comparing wireless network signal strengths from client network devices received by multiple wireless access points.

Once step 215 has identified one or more classes associated with the user, step 215 presents this class list to the user and receives a class selection from the user in response.

In an embodiment, if step 215 only identifies a single class associated with a user, for example by cross-referencing the current day and time and/or user location with a class schedule, then the class may be automatically selected by step 215.

Following step 215, step 220 identifies additional client network devices associated with the class selected by the user. In an embodiment, step 220 accesses a database or other data storage structure to identify students or other personnel assigned to the selected class. Step 220 then accesses a database or other data storage structure to identify client network devices assigned to these students. If students are assigned to a specific client network devices, client network device identifiers, such as MAC addresses, may be associated with student records in the database or other data storage structure. In a further embodiment, step 220 may access an authentication or user directory system, such as RADIUS, Active Directory, or Captive Web Portal, to match students with specific network devices. In another embodiment, if a private PSK scheme is used, step 220 may search the network for client network devices connected using PSK's assigned to the students of the selected class.

In another embodiment, step 215 may be optionally omitted and step 220 of method 200 identifies client network devices of interest to the user based on criteria other than the class associations. For example, an embodiment of step 220 identifies the location of the user, as described above, and then identifies one or more student client network devices at the same location, such as in the same classroom. In another example, multiple client network devices may be assigned to a group, representing a cabinet or cart of computer shared by students and teachers. In this example, step 220 identifies the group associated with the network client used by the user and selects all of the other active client network devices associated with this group for monitoring.

In yet another embodiment, step 220 may identify the location, such as a specific classroom, of the user's computer or other client network device, and then search for other client network devices at the same location. Any other client network devices in the same location, e.g. the same classroom as the user, are automatically selected for monitoring by the user.

Step 225 selects one of the wireless access points of the network to service the user's monitoring request. By distributing different user monitoring requests to different wireless access points for servicing, this embodiment of the invention balances the processing load required by the monitoring system across the excess computing capacity of existing network devices. This eliminates the need for additional, dedicated network devices to implement embodiments of the invention.

In an embodiment, step 225 identifies one or more wireless access points on the network that are providing wireless network connections to at least one of the identified student client network devices and/or the user's client network device. If there is only one wireless access point providing wireless network connections to these client network devices, an embodiment of step 225 selects this wireless access point to service the user's monitoring request. If there are two or more wireless access points providing wireless network connections to these client network devices, an embodiment of step 225 selects the wireless access point providing the majority of wireless network connections to service the user's monitoring request.

In another embodiment, if no client network devices associated with a class are connected with any wireless access point, step 225 may select the wireless access point that has the lowest workload at the time of the monitoring request. In another embodiment, step 225 uses load-balancing techniques to select the appropriate wireless access point for servicing the user's monitoring request.

In another embodiment, an administrative user may preconfigure one or more of the wireless access points to service users' monitoring requests. For example, an administrative user may preconfigure a wireless access point located in or a near a specific classroom or other type of location to service all monitoring requests from users in that classroom. In this embodiment, step 225 identifies the classroom or other type of location associated with the user's monitoring request and selects the wireless access point preconfigured for this location.

In still another embodiment, an administrative or management application or an optional wireless network controller monitors the activity of client network devices to identify the wireless access points that each class or other group of client network devices access most frequently. After gathering sufficient records of a class' network usage, step 225 selects the wireless access point for a monitoring request that was previously used frequently by this class.

Step 230 redirects the user to the selected wireless access point. In an embodiment, the user interface for monitoring and supervising student client network devices is provided as web pages. Prior to step 230, an embodiment of method 200 may provide web pages for user interaction using the wireless access point manager or other network devices. Step 230 redirects the user's web browser on his or her client network device to the selected wireless access point. The selected wireless access point then provides additional web pages for further user interaction, including the ongoing monitoring and supervision of student client network devices.

As discussed above, multiple wireless access points may provide network connections to a portion of the identified student client network devices. If this is the case, then optional step 235 configures any unselected wireless access points providing a network connection to at least one of the identified student client network devices to redirect network activity information for their identified student client network devices to the selected wireless access point. If the selected wireless access point is providing wireless network connections to all of the identified student client network devices of interest to the user, then step 235 may be omitted.

Step 240 monitors the network activity of the identified student client network devices and presents this information to the user via a user interface, implemented for example as a web page. The user interface may be automatically updated in real time, near real time, or periodically with updated network activity information, or on request from the user. As described in detail below, network activity information can include information for each student's client network device such as the wireless network connection status; the software applications used to access the network; the network resources accessed by the student, such as web pages or network locations; and the upstream and/or downstream network bandwidth used by the student's client network device. In an embodiment, all of the network activity information can be collected by wireless access points and/or other network devices, eliminating the need to install monitoring software on student's client network devices.

As described in detail below, step 240 may also receive control inputs from the user to change the wireless network connections of one or more student client network devices. Changes to wireless network connections can include enabling or disabling local and/or wide-area network access for one or more of the students and redirecting one or more of the students' client network devices to a network resource, such as a web page, specified by the user.

As described above, embodiments of method 200 may access a database or other data structure to determine class schedules, class locations, lists of students and teachers assigned to classes, and other information. In one embodiment, one or more data files, such as spreadsheets or CSV data files, including this information are uploaded by an administrator to the system. In another embodiment, the system accesses an external school administrative system or student information system via an API or other interface to retrieve this information in advance or as needed. In still another embodiment, the system provides a self-registration process that enables students and teachers to manually associate themselves with a class. For example, a teacher or other user may manually create an entry for a class. In response, the system provides the teacher with a registration code that is unique for this class. The teacher then provides this registration code to his or her students. Upon connecting with the wireless network, student are prompted to enter their registration code to associate their user identifications and/or their client network devices with this class. The self-registration process may only need to be performed once for each student (for example on the students' first day of class). On subsequent class sessions, this embodiment of the invention uses information obtained from students' previous self-registrations, such as user identifications and/or client network device identifications, to associate students with their classes.

Figure 3:
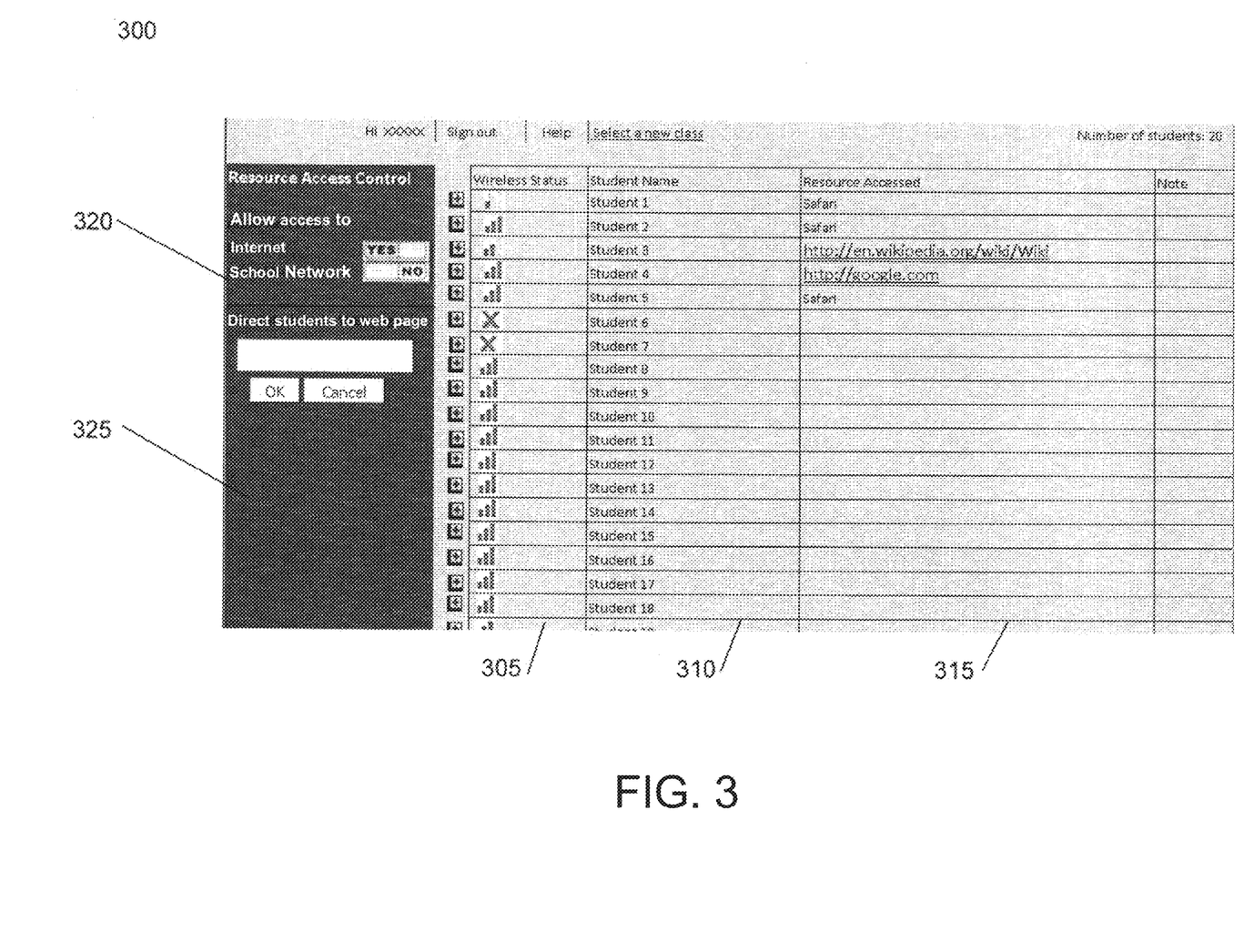
FIG. 3 illustrates an example user interface suitable for presenting user information according to an embodiment of the invention.

FIG. 3 illustrates an example user interface 300 suitable for presenting user information according to an embodiment of the invention. As described above, user interface 300 may be implemented as one or more web pages provided by a wireless access point or other network device. User interface 300 includes a student list 303. The student list 303 includes student names 310 and student network activity information, such as their wireless network connection status 305 and a network resource list 315 of network resources accessed by each student, such as web pages. In a further embodiment, the wireless network connection status 305 may include a simplified display of wireless network connection information, such as a red icon if there is a problem with a student's wireless network connection or a green icon if a student's wireless network connection is operating correctly. In yet a further embodiment, the wireless network connection status 305 may be based in part on criteria, such as bandwidth usage, or network events, such as attempting to access a blocked web page. If a student's network activity exceeds a criteria or includes a prohibited type of network event, the student's wireless network connection status 305 may be updated to indicate this to the teacher or other user, for example by changing the icon associated with the student's wireless network connection status 305. In these embodiments, the wireless network connection status 305 may be based on an aggregate evaluation of two or more different types of network activity information.

Example user interface 300 also includes user interface controls for controlling the network connections of the students. For example, user interface 300 includes network access controls 320 for enabling or disabling network access to local and/or wide-area networks for one or more students. The functionality of these controls is implemented by the wireless access points and/or other network devices by selectively passing or blocking network traffic based on network addresses for one or more students.

Additionally, example user interface 300 includes a redirection control 325. The redirection control 325 enables teachers or other users to direct their students to a specific web page or other network resource. This feature can save time and reduce errors arising from students having to manually enter network addresses. A teacher or other user enters an address of a network resource, such as a URL of a web page, into the redirection control. The teacher can then instruct his or her students to refresh the web page in their web browsers. The wireless access points and/or other network devices intercept these refresh requests and reply with an HTTP redirect instruction to the network address provided by the teacher.

Although the above-described embodiments refer to applications within schools and other educational environments, embodiments of the invention may be readily deployed in any other type of environment where one or more users require a simplified interface for monitoring and optionally controlling network access for large numbers of other users. Examples of other types of environments include hospitals, conference centers, and business offices.

Figure 4:
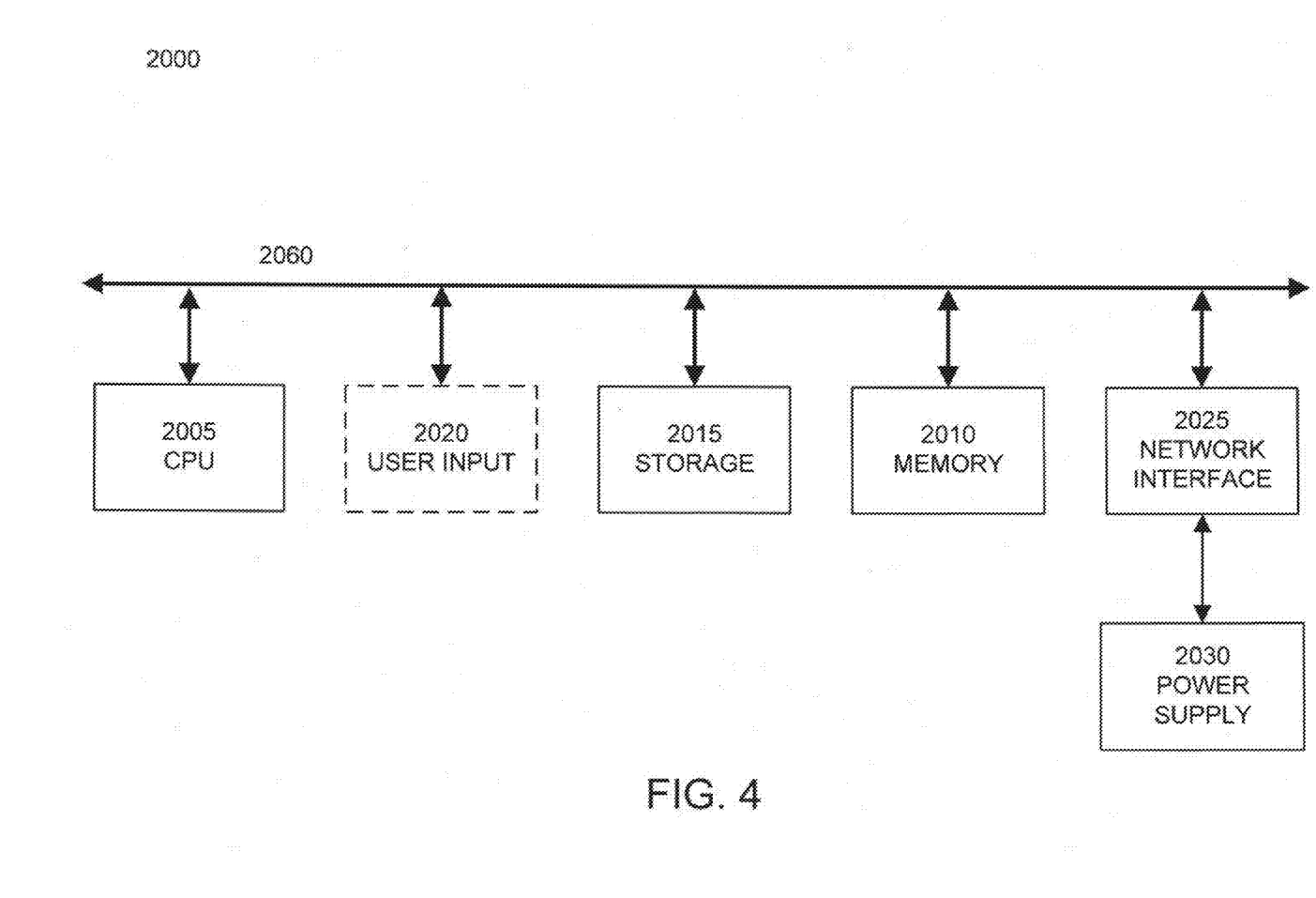
FIG. 4 illustrates a computer system suitable for implementing all or a portion of embodiments of the invention.

FIG. 4 illustrates a computer system 2000 suitable for implementing all or a portion of embodiments of the invention. FIG. 4 is a block diagram of a computer system 2000, such as a personal computer or other digital device, suitable for practicing an embodiment of the invention. Embodiments of computer system 2000 include dedicated networking devices, such as wireless access points, network switches, hubs, routers, hardware firewalls, network traffic optimizers and accelerators, network attached storage devices, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices. Memory 2010 may store a firmware image comprising applications and data adapted to be executed by computer system 2000.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include a wired networking interface, such as one or more Ethernet connections to communicate with other networking devices via local or wide-area networks. In a further embodiment, computer system 2000 may be capable of receiving some or all of its required electrical power via the network interface 2025, for example using a wired networking interface power over Ethernet system.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

A power supply 2030 provides electrical power to the computer system 2000. Power supply 2030 may be adapted to draw electrical power from a connection with an electrical power distribution grid. In an embodiment, power supply 2030 is connected with network interface 2025 to draw electrical power for computer system 2000 from one or more wired network connections using a network power standard, such as IEEE 802.3af.

Although embodiments of the invention are discussed with reference to the IEEE 802.11 standard, embodiments of the invention are equally applicable to other standard and proprietary wireless network protocols. Additionally, embodiments of the invention are not limited to 802.11 wireless network connections and may be utilized for any type of communication network where a network connection between a client wireless network device and a wireless network device is required.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
   receiving a monitoring request, from a first network device associated with a first network user, to monitor the first network device and a group of additional network devices, the first network device and the group of additional network devices being associated with one or more network clients for network activity related to a network;
   polling a plurality of wireless access points configured to provide access to the network in order to identify a first wireless access point of the plurality of wireless access points, the first wireless access point being configured to monitor activity of the group of additional network devices associated with the first network device;
   configuring the first wireless access point to monitor the network activity of the group;
   collecting network activity information for at least a first portion of the group of additional network devices, the network activity information relating to network activity of the first portion of the group of additional network devices through the first wireless access point;
   providing instructions to the first wireless access point to provide the network activity information to the first network device;
   receiving, using the first wireless access point, a first network resource address from the first network device;
   intercepting, using the first wireless access point, a second network resource request from at least one network device in the group of additional network devices;
   identifying a location of the at least one network device;
   associating the at least one network device with the group of additional network devices in response to identifying the location of the at least one network device;
   in response to identifying the at least one network device as being associated with the group of additional network devices, redirecting the at least one network device to the second network resource address by providing a location-specific redirection response message including the second network resource address to the at least one network device, the location-specific redirection response message being based, at least in part, on the location of the at least one network device.

2. The method of claim 1, wherein the group of additional network devices includes a class, further comprising identifying the group of additional network devices associated with the first network device, the identifying the group of additional network devices comprising accessing class data to identify the group of additional network devices based on an association between the group of additional network devices and the class.

3. The method of claim 2, wherein identifying the group of additional network devices comprises receiving from the first network device a class selection specifying the class.

4. The method of claim 2, wherein identifying the group of additional network devices comprises accessing the class data to identify classes associated with the first network device, further comprising:
   accessing the class data to identify a class schedule associated with the first network device;
   automatically selecting the class from classes associated with the first network device based on the class schedule and a current time.

5. The method of claim 1, further comprising configuring a second wireless access point providing wireless network connections to a second portion of the group of additional network devices to collect second network activity information and forward the second network activity information to the first wireless access point.

6. The method of claim 1, further comprising in response to receiving an input from the first network device, preventing the at least one network device from accessing at least one network address.

7. The method of claim 6, wherein the at least one network address identifies a network location on a local-area network including the at least one network device.

8. The method of claim 6, wherein the at least one network address is accessed via a wide-area network.

9. The method of claim 1, wherein the first wireless access point intercepts the network resource request from the at least one network device.

10. The method of claim 1, wherein the network resource request is a Hypertext Transport Protocol (HTTP) request.

11. The method of claim 1, wherein the location-specific redirection response message comprises a Hypertext Transport Protocol (HTTP) redirect instruction.

12. The method of claim 1, further comprising identifying the group of additional network devices associated with the first network device, the identifying the group of additional network devices associated with the first network device comprising:
   identifying a first client network device providing the monitoring request;
   identifying the first network device based on an association between the first network device and the first client network device;
   accessing class data to identify the group of additional network devices associated with the first network device;
   identifying additional client network devices associated with the group of additional network devices.

13. The method of claim 12, wherein the identifying the first wireless access point comprises identifying at least one wireless access point providing wireless network connections with at least a portion of the additional client network devices.

14. The method of claim 1, wherein the receiving the monitoring request from the first network device comprises authenticating the first network device.

15. The method of claim 1, wherein the providing the network activity information to the first network device using the first wireless access point comprises:
   determining an aggregate evaluation of network activity information for each of at least a second portion of the group of additional network devices;
   providing the aggregate evaluation of network activity information to the first network device for display as visual indicators.

16. The method of claim 15, wherein the aggregate evaluation of network activity information is further based on at least one criterion.

17. The method of claim 15, wherein the aggregate evaluation of network activity information includes an indicator of a network event.

18. The method of claim 15, wherein the aggregate evaluation of network activity information is based on factors including wireless network connection status.

19. A system, comprising:
   a processor;
   a memory including instructions to cause the processor to perform the steps of:
      receiving a monitoring request, from a first network device associated with a first network user, to monitor the first network device and a group of additional network devices, the first network device and the group of additional network devices being associated with one or more network clients for network activity related to a network;
      polling a plurality of wireless access points configured to provide access to the network in order to identify a first wireless access point of the plurality of wireless access points, the first wireless access point being configured to monitor network activity of the group of additional network devices associated with the first network device;
      configuring the first wireless access point to monitor the network activity of the group;
      collecting network activity information for at least a first portion of the group of additional network devices, the network activity information relating to network activity of the first portion of the group of additional network devices through the first wireless access point;
      providing instructions to the first wireless access point to provide the network activity information to the first network device;
      receiving, using the first wireless access point, a first network resource address from the first network device;
      intercepting, using the first wireless access point, a second network resource request from at least one network device in the group of additional network devices;
      identifying a location of the at least one network device;
      associating the at least one network device with the group of additional network devices in response to identifying the location of the at least one network device;
      in response to identifying the at least one network device as being associated with the group of additional network devices, redirecting the at least one network device to the second network resource address by providing a location-specific redirection response message including the second network resource address to the at least one network device, the location-specific redirection response message being based, at least in part, on the location of the at least one network device.

* * * * *

UNITED STATES PATENT AND TRADEMARK OFFICE
CERTIFICATE OF CORRECTION

PATENT NO. : 9,282,018 B2  
APPLICATION NO. : 14/177159  
DATED : March 8, 2016  
INVENTOR(S) : Long Fu et al.

Page 1 of 1

It is certified that error appears in the above-identified patent and that said Letters Patent is hereby corrected as shown below:

Claims

In column 9, claim 1, line 61:

"--monitor activity of the group of additional network--"

should be changed to:

"--monitor network activity of the group of additional network--"

Signed and Sealed this  
Third Day of May, 2016

Michelle K. Lee  
*Director of the United States Patent and Trademark Office*